UNITED STATES PATENT OFFICE.

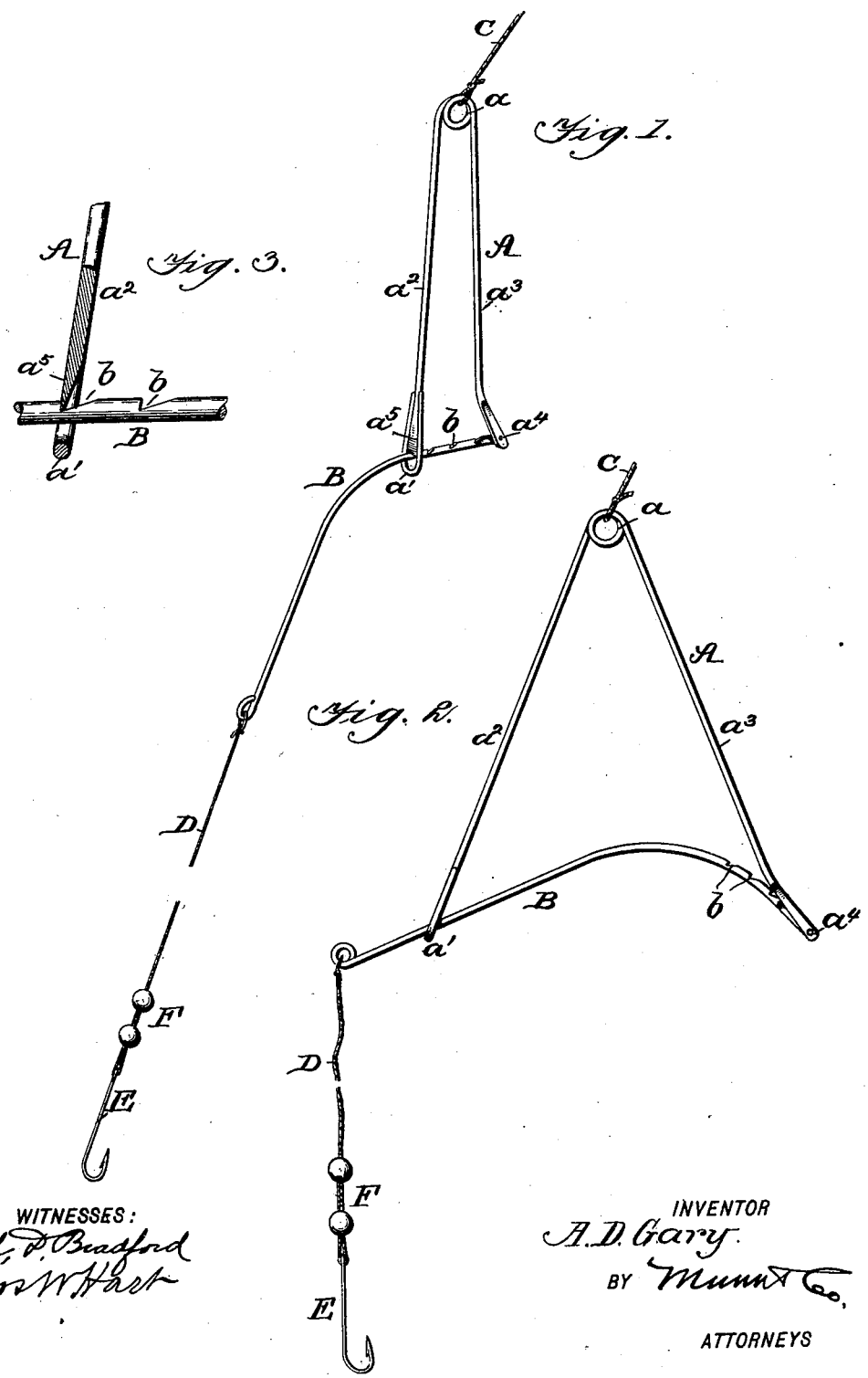

ALBERT DAVIS GARY, OF LAVONIA, GEORGIA, ASSIGNOR OF THREE-FIFTHS TO JOSEPH W. CANNON, CHARLES A. ADDINGTON, AND WILLIAM H. ADDINGTON, OF SAME PLACE.

SPRING ATTACHMENT FOR FISH-HOOKS.

SPECIFICATION forming part of Letters Patent No. 677,655, dated July 2, 1901.

Application filed April 9, 1901. Serial No. 55,009. (No model.)

*To all whom it may concern:*

Be it known that I, ALBERT DAVIS GARY, residing at Lavonia, in the county of Franklin and State of Georgia, have made certain new and useful Improvements in Spring Attachments for Fish-Hooks, of which the following is a specification.

My invention is an improvement in the class of spring attachments for fish-hooks which are adapted to be set by compressing a spring and to be released by a pull on the hook, whereby a fish seizing the bait is impaled and caught.

The invention is distinguished by simplicity, cheapness, and portability, it being composed of two members, one of which is connected with the hook and the other with the fishing-line.

The construction and operation of the device are illustrated in the accompanying drawings, in which—

Figure 1 is a perspective view showing the same set as when in use. Fig. 2 is a side view showing the spring released or sprung. Fig. 3 is a detail view of the lock or catch for the spring proper.

The device is formed of the spring proper, A, which is V or U shape, and a curved trip-wire B. These parts are connected and cooperate as follows: The spring A has a coil $a$ at its apex or middle and is provided with a loop $a'$ at the free end of one leg $a^2$, which receives the trip-wire B, while the other leg $a^3$ is pivoted at $a^4$ to the upper extremity of the wire B, as shown. The latter is curved downward and provided on its upper side, adjacent to the pivot $a^4$, with a series of notches or shoulders $b$. (See Fig. 3.) The leg $a^2$ of the spring A is adapted to engage one of said notches $b$, it being for this purpose constructed with a beveled or wedge point $a^5$. A fishing-line C is attached to the coil or eye $a$ of the spring A, and a snood or short line D, provided with a barbed hook E and sinkers F, is attached to the free or lower end of the trip-wire B.

It is apparent that if the spring A be compressed, as shown in Fig. 1, and the beveled or wedge point $a^5$ of its leg $a^2$ be engaged with a notch $b$ of trip-wire B the parts will remain thus engaged by reason of resiliency of the spring until released by a slight downward pull on the snood D, which is given when a fish seizes the duly-baited hook E. The instant of such disengagement the legs $a^2 a^3$ of the spring A separate widely, as shown in Fig. 2, whereby the curved portion of the trip-wire B is drawn through the loop $a^5$ of leg $a^2$ and its lower end thus jerked upward a distance corresponding to the degree of curvature of the wire, thereby impaling the fish.

The device has maximum simplicity and efficiency and occupies small space, so as to be easily carried by the angler.

What I claim is—

1. A spring attachment for fish-hooks comprising a wire curved as described, a spring, one end of which has a fixed connection with said wire and the other end a slidable connection with the curved portion of the wire, so that when the spring is tripped the free end of the spring sliding along the wire raises its free end and the hook secured thereto, as specified.

2. The attachment herein described comprising a bowed spring and a bent wire which are permanently connected at the extremity of one leg of the spring, and slidably connected at the extremity of the other, where they are also adapted for temporary locking engagement, substantially as shown and described.

3. The improved spring attachment for fish-hooks comprising a bowed spring having a loop at the extremity of one leg, and a bent wire which is connected with the other leg and adapted to slide and lock in said loop, substantially as shown and described.

4. The improved spring attachment for fish-hooks comprising the U-shaped spring having one of its legs provided with a loop and engaging point, and a wire connected with the other leg and having one or more adjacent notches, the body of the wire being held slidably in the said loop and curved downward, substantially as shown and described.

5. The combination, with the automatic spring attachment comprising a bowed spring and a bent wire connected at one point and adapted for releasable engagement at another, of a hook and snood, the latter being attached to the lower end of the wire, as shown and described.

ALBERT DAVIS GARY.

Witnesses:
OSCAR CANNON,
O. D. CANNON.